US008167220B2

(12) United States Patent
Jost

(10) Patent No.: US 8,167,220 B2
(45) Date of Patent: May 1, 2012

(54) HEADPIECE FOR ACTUATOR

(75) Inventor: Scott Jost, Naperville, IL (US)

(73) Assignee: Berlin Packaging, LLC, Chicago, IL (US)

( * ) Notice: Subject to any disclaimer, the term of this patent is extended or adjusted under 35 U.S.C. 154(b) by 388 days.

(21) Appl. No.: 12/563,335

(22) Filed: Sep. 21, 2009

(65) Prior Publication Data

US 2011/0068198 A1 Mar. 24, 2011

(51) Int. Cl.

| | |
|---|---|
| ***B05B 9/043*** | (2006.01) |
| ***B05B 1/14*** | (2006.01) |
| ***G01F 11/00*** | (2006.01) |
| ***B67D 7/60*** | (2010.01) |
| ***B67D 7/58*** | (2010.01) |

(52) U.S. Cl. ..... 239/333; 239/558; 239/559; 222/321.8; 222/372; 222/383.1

(58) Field of Classification Search .................. 239/333, 239/504, 548, 556, 558, 559, 567; 222/321.1, 222/321.7–321.9, 372, 383.1, 385, 478

See application file for complete search history.

(56) References Cited

U.S. PATENT DOCUMENTS

| | | | | |
|---|---|---|---|---|
| 2,657,951 | A * | 11/1953 | North, Jr. | 239/556 |
| 4,280,638 | A | 7/1981 | Keihm | |
| 4,582,227 | A | 4/1986 | Kanfer | |
| 4,796,806 | A * | 1/1989 | Reid | 239/11 |
| 6,209,184 | B1 | 4/2001 | Copeland et al. | |
| 6,513,684 | B1 * | 2/2003 | Bougamont et al. | 222/548 |
| 6,533,144 | B2 | 3/2003 | Davies et al. | |
| 7,261,103 | B2 * | 8/2007 | Katz | 128/200.15 |
| 2004/0164102 | A1 * | 8/2004 | Green | 222/321.7 |

* cited by examiner

*Primary Examiner* — Darren W Gorman

(74) *Attorney, Agent, or Firm* — Adam K. Sacharoff

(57) ABSTRACT

In one embodiment there is provided an end fitment for use with an actuator used from drawing fluid from a container through a tube, the actuator has a depression face and a neck extending there from for connection to a corner end extending downwardly for securing the end fitment thereto. The end fitment further including a lower end for attaching to a headpiece. The headpiece has a concaved bottom surface that transitions to a surrounding side surface and has a plurality of openings positioned about the bottom surface for ejecting a fluid within the container. The plurality of openings are positioned into a pair of concentric rows, defined as a first concentric row of openings positioned within a second concentric row of openings.

10 Claims, 8 Drawing Sheets

125
135
145
170
150
172
174
182
184
176
187
180
165
155
120
137

HEADPIECE FOR ACTUATOR

FIELD OF THE INVENTION

The present invention relates to fluid dispensers, and particularly though not exclusively to an actuator head with an improved ejector headpiece.

BACKGROUND OF THE INVENTION

Liquids are often sold to consumers in a variety of different types of containers. When the liquids require fast dispensing (such as in a restaurant or coffee shop) the container typically has an actuator head that is depressed to dispense the product onto glass or cup (referred to generally as "cup"). There are different actuator heads which can be used with both manual and automatic pumping means, but the dispensers all operate on similar principles. Examples include U.S. Pat. Nos. 4,582,227, 6,209,184, 4,280,638, and 6,533,144 which show the use of actuators, all of which are incorporated by reference. The actuators include an actuator head which depressed, draws liquid product up a feed pipe and dispensed through a nozzle in the actuator head.

The dispensers are generally simple and convenient to use, but can cause problems especially when the cup is not positioned immediately adjacent to the nozzle head. For example, when the cup is positioned away from the nozzle head, the liquid has the extreme tendency to bubble and fall away from the main stream of the liquid. This can cause spills and incidental leaks over the cup and user. Despite many years of technological development in this area, dispensers and actuators remain relatively the same and without any advancement in solving this problem. Therefore, an advantage over the prior art would be to an invention that is capable of decreasing these types of spills and leaks by keeping the flow of the liquid relatively straight.

SUMMARY OF THE INVENTION

In one embodiment of the present invention there is provided an actuator for use with a pump and in connection with a container having a fluid therein. The pump typically includes a tube for the communication of a fluid from the container to the actuator. The embodiment of the present invention rests in the actuator which includes a depressor face, a neck and a nozzle assembly. The depressor face has an upper side adapted for engagement by an operator and a lower end with a connector adapted for engagement to an end of the tube. The neck extends from a side end of the depressor face and includes a channel in fluid communication with the connector. The nozzle assembly is secured to an end of the neck and has an internal channel in fluid communication with the channel defined by the neck. An exit end is also provided for the ejection of the fluid manually pumped from the container. The nozzle assembly includes a headpiece secured thereto and defined as having a bottom surface transitioning to a surrounding side surface with a plurality of openings positioned about the bottom surface.

In other embodiments, the plurality of openings are positioned into a pair of concentric rows, defined as a first concentric row of openings and a second concentric row of openings. In a preferred example the first concentric row of openings are positioned within the second concentric row of openings and have smaller openings than the second concentric row of openings.

In other aspects of the invention the headpiece may include threads adapted to complimentary threads on the exit end of the nozzle assembly such that the headpiece is removably secured to the exit end of the nozzle assembly. The headpiece may also have concaved bottom surface and/or include a plurality of knurls positioned around an outside portion of the surrounding side surface.

Other embodiments of the present invention help to further define the nozzle assembly to include a corner fitment and a lower fitment. The corner fitment has first and second ends, where the first end is secured to an end of the neck. The lower fitment has upper and lower ends. The upper end being secured to the second end of the corner fitment, while the lower end has means for attaching the headpiece. The lower fitment may also include a body having a tapering profile that decreases in perimeter from the upper end to the lower end.

In yet other embodiments, there is provided an actuator for use with a pump and in connection with a container having a fluid therein. The actuator has a depression face and a neck extending there from for connection to a corner fitment having a corner end extending downwardly. The improvement of the actuator includes a lower fitment and a headpiece, similarly described above.

In still other embodiments, there is provided an end fitment for use with an actuator that is used with a pump and in connection with a container having a fluid therein. The actuator has a depression face and a neck extending there from for connection to a corner fitment having a corner end extending downwardly for securing to the end fitment. The end fitment further comprising a lower end for attaching to a headpiece. The headpiece has a concaved bottom surface transitioning to a surrounding side surface and a plurality of openings positioned about the bottom surface for ejecting a fluid within the container. The plurality of openings are preferably positioned into a pair of concentric rows, defined as a first concentric row of openings and a second concentric row of openings, and wherein the first concentric row of openings are positioned within the second concentric row of openings.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE DRAWINGS

Figure 1:
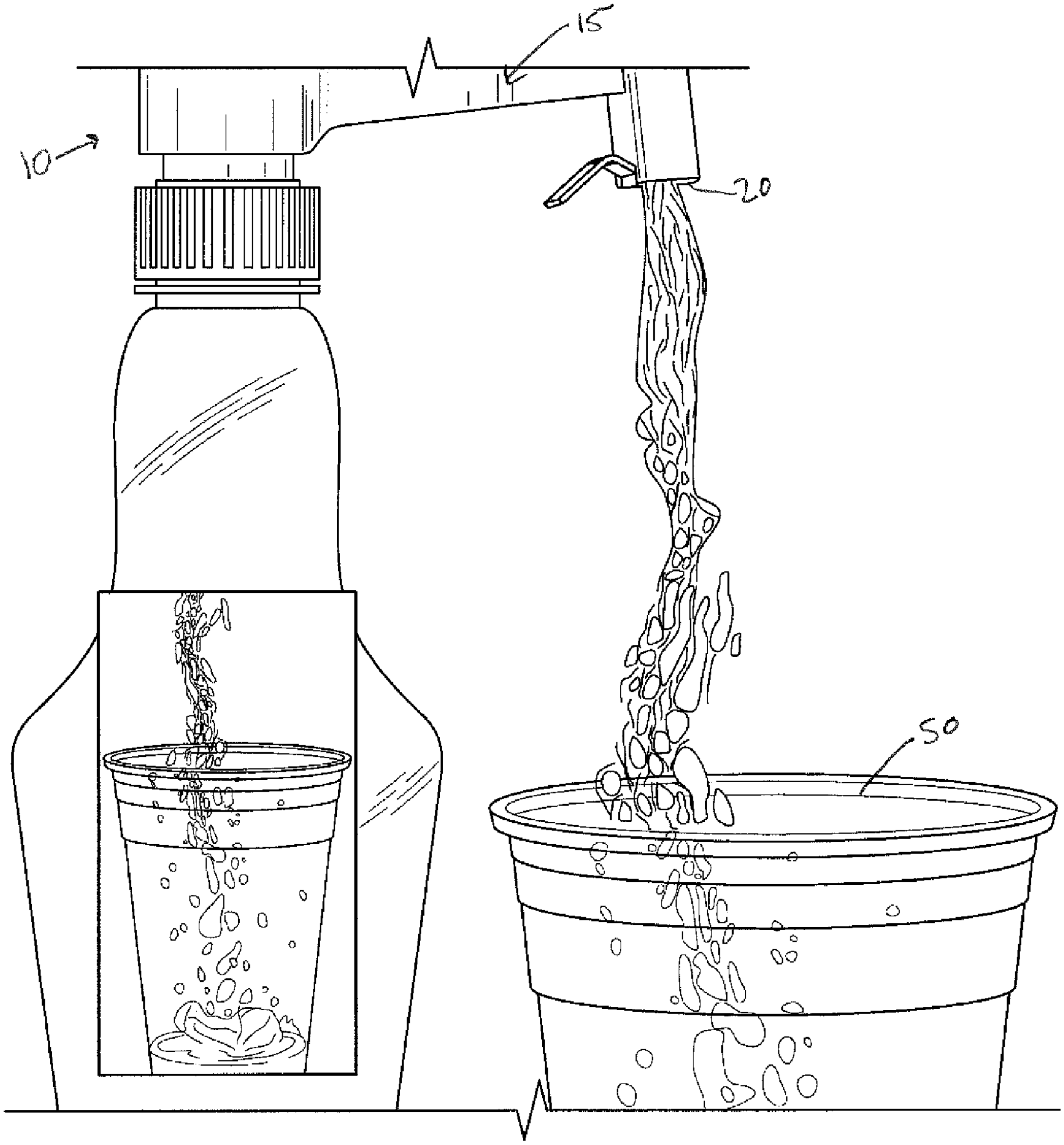
FIG. 1 (Prior Art)
FIG. 1 is a prior art view of a dispenser showing splattering of liquid.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Referring now to FIG. 1, the prior art actuator heads 15 for a liquid dispensing pump systems 10 shows that the farther the cup 50 is placed from the nozzle 20, the more the liquid disperses from a stream to droplets. The dispersion of the droplets splatter often creating a mess. Therefore the present invention illustrated and described through FIGS. 3 through 7D is provided as an improvement over the prior art.

Referring now to FIGS. 3 through 7D, there is provided in accordance with one embodiment of the present invention, a dispenser 100 that includes a container bottle 105 having a top portion 110 and a body portion 115. A liquid product is contained within the container body portion 115. A pump (not shown, or other similar mechanisms) draws liquid in the container body portion 115 typically by having a user press the actuator head 120, which has depending therefrom a tube 122 which extends to the bottom of the body portion 115. The pump is secured relative to the top portion 110 by well known convenient methods. As further explained below most of the components of the actuator 120 are known dispenser components and may be changed without effecting the scope of the invention. An important aspect of the invention lies in the improved nozzle assembly.

Figure 5:
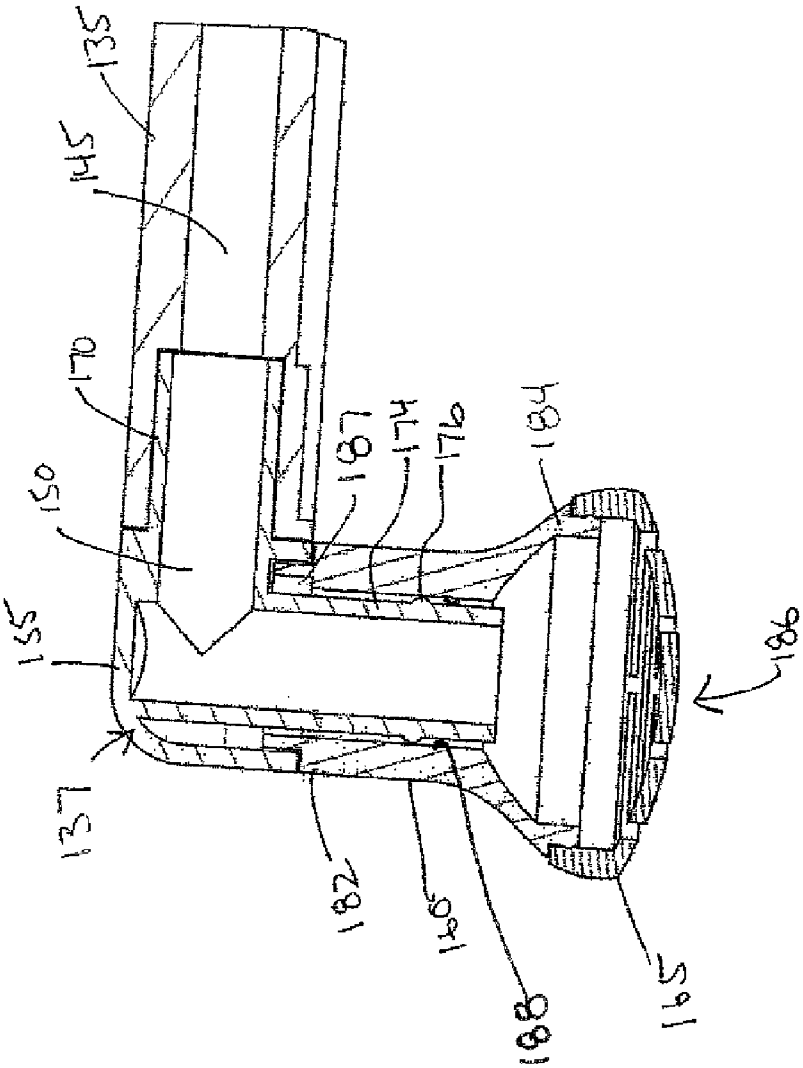
FIG. 5 is a partial cross sectional view of an improved actuator head for a dispenser in accordance with an embodiment of the present invention.
Figure 6:
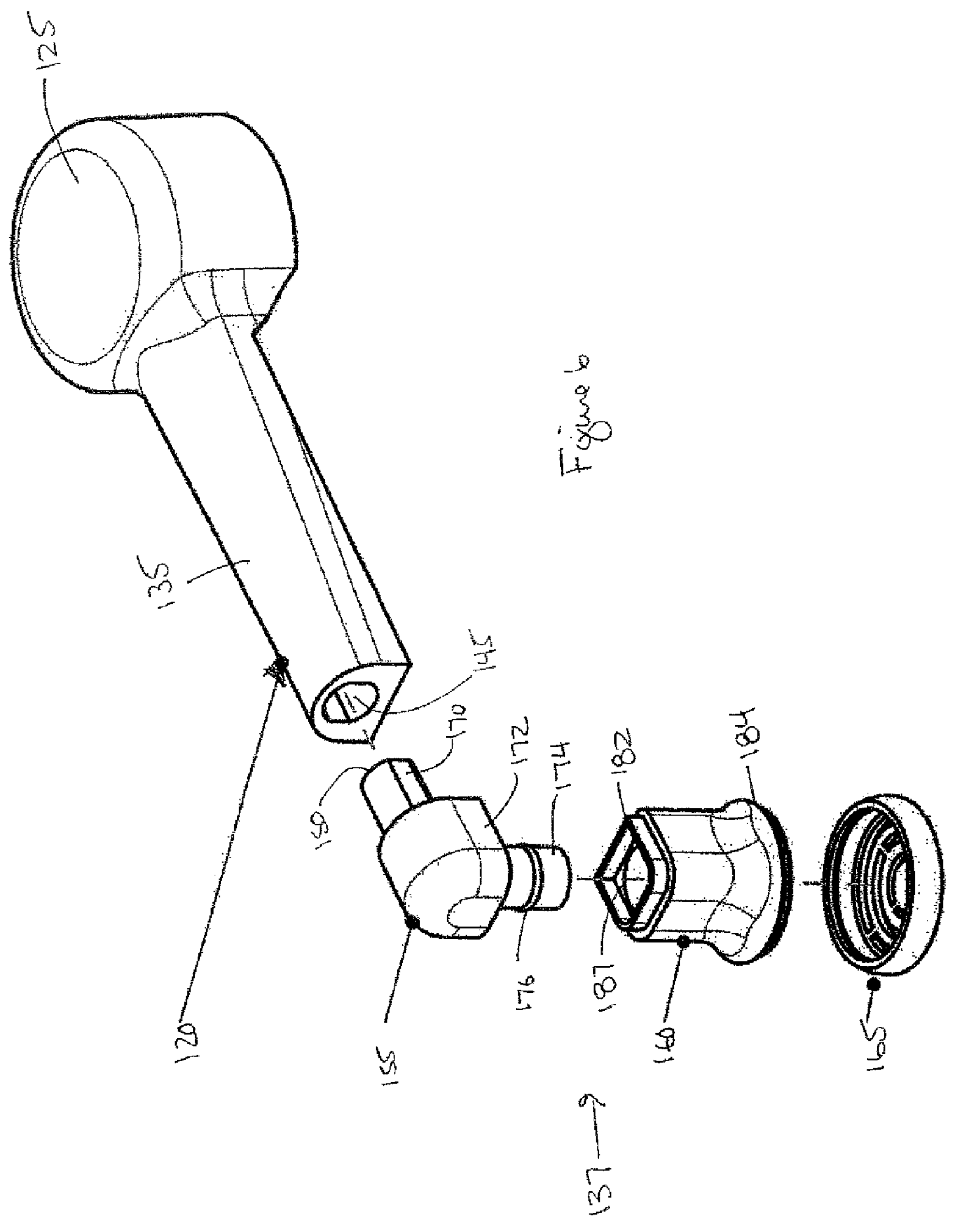
FIG. 6 is an exploded view of an improved actuator head for a dispenser in accordance with an embodiment of the present invention.
Figure 7A:
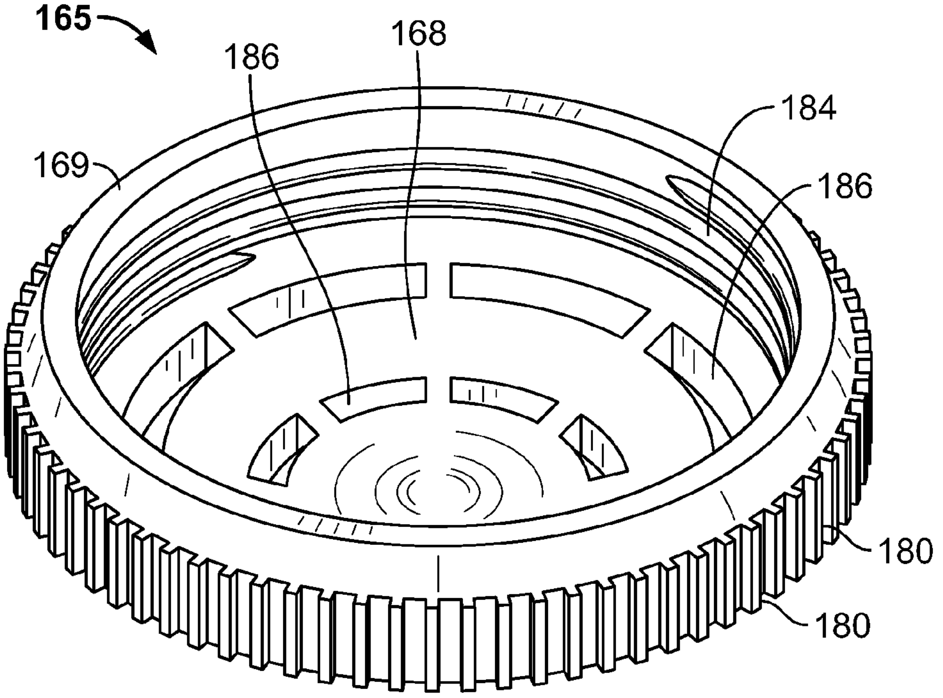
FIGS. 7A-7D are various views of an improved headpiece which secures to the end of the nozzle assembly in accordance with an embodiment of the present invention.
Figure 7B:
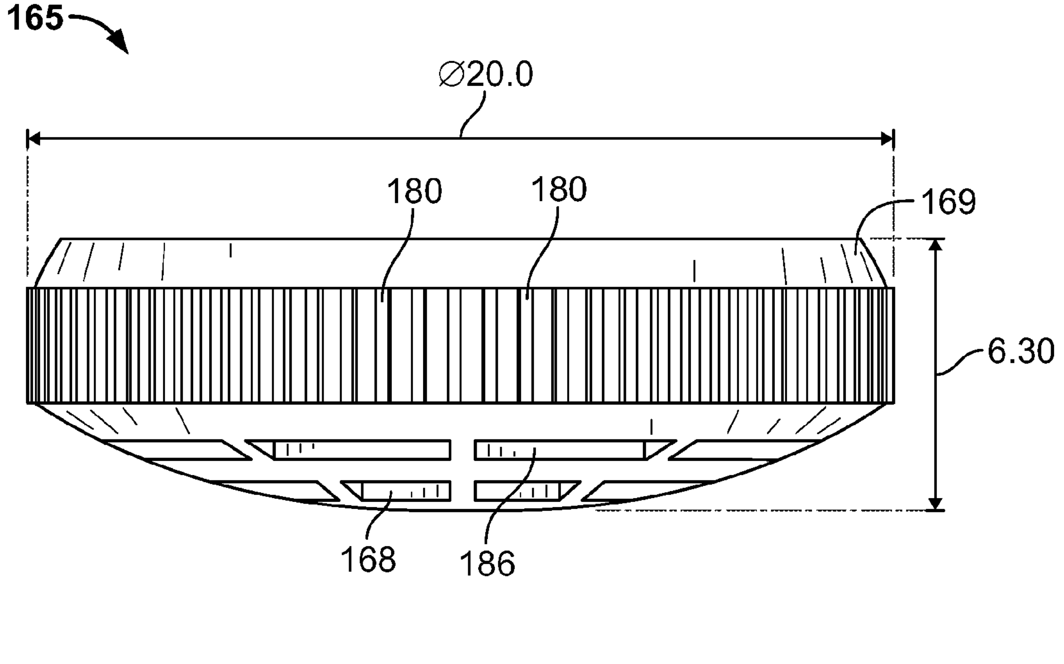
Figure 7C:
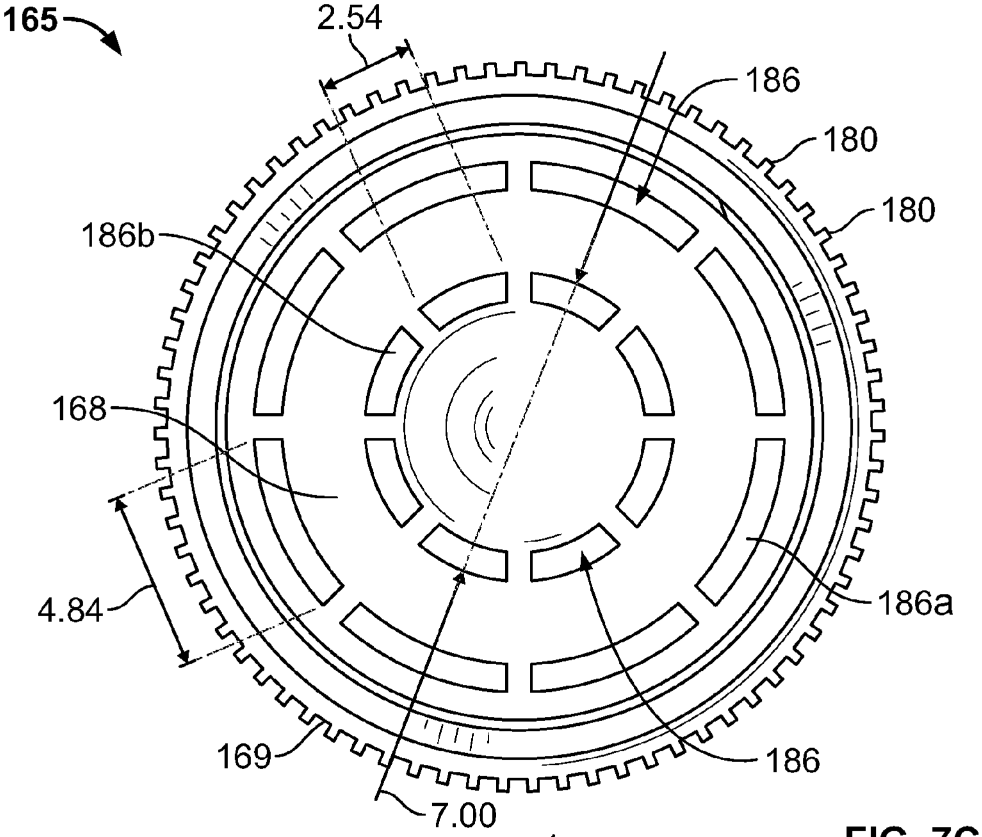
Figure 7D:
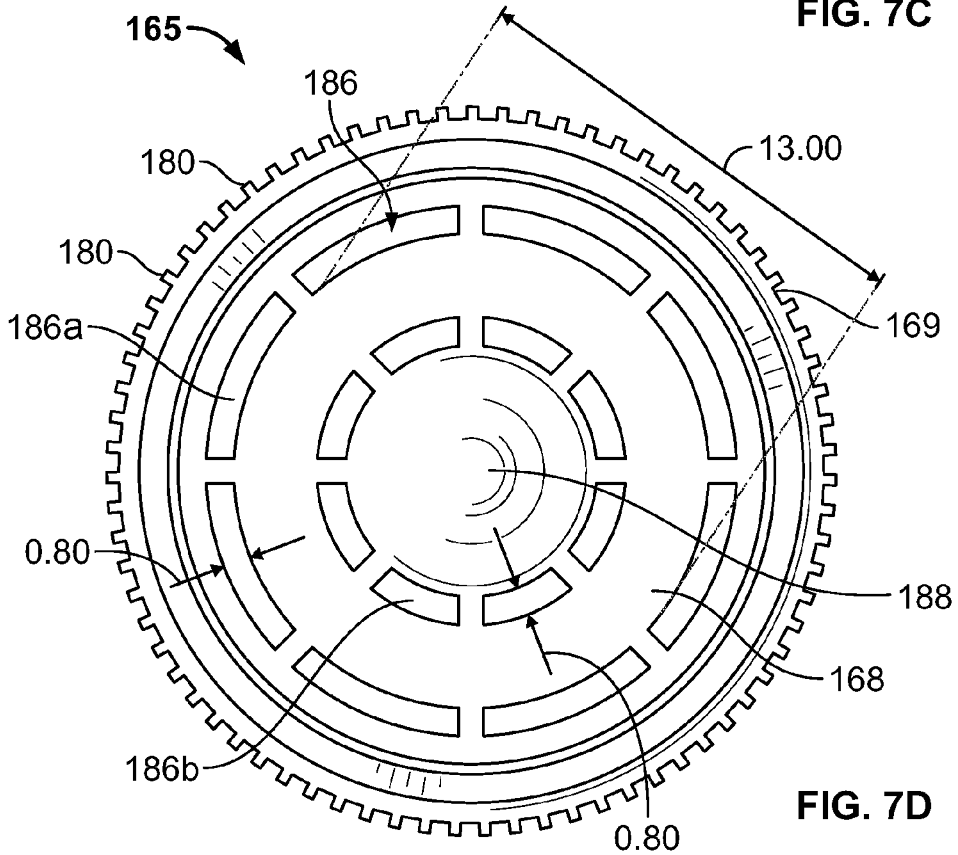

The actuator head 120 comprises a depressor face 125 that in use is typically contacted by a user's finger or hand to depress the head 120 downwardly, drawing product up the tube, and dispensed through the nozzle assembly 130. The actuator head includes a neck 135 which attaches the depressor face 125 to the nozzle assembly 130. Viewing the pump actuator head 120 from slightly underneath (FIG. 4), it is shown that the pump actuator head 120 includes a connector 140 under the depressor face 125 for connecting to the tube 122. The connector 140 is a fluid communication transition between the tube 122 and a channel 145 running through the neck 135. The channel 145 continues through the neck and connects into a nozzle channel 150 bored through the nozzle assembly 137 (FIG. 5). It is well understood that both manual and automatic actuators may be used and that the invention lies more with the improved nozzle assembly and more specifically the lower fitment and headpiece.

The nozzle assembly 137 is defined to include a corner fitment 155, a lower fitment 160 and a headpiece 165. The corner fitment 155 includes a first end 170 protruding from a side of the corner fitment body 172 and a second end 174 protruding from a lower end of the corner fitment body 172. The first end 170 would slide into engagement with the channel 145 of the neck 135, while the second end 174 will slide into engagement with an upper end of the lower fitment 160. The corner fitment 155 is either hollow or includes a portion of the nozzle channel 150 for facilitate the ability to transfer fluid from the bottle, through the nozzle assembly and out the headpiece 165. The second end 174 may further include a ring 176 to help secure it within the lower fitment 160. In addition, the first and second ends of the corner fitment 155 may be secured in position with an adhesive or epoxy.

The lower fitment 160 is defined by a lower fitment body 180 that has defined an upper end 182 and a lower end 184. The lower fitment body 180 is also either hollow or includes a portion of the nozzle channel 150 to facilitate the transfer of fluid from the bottle therethrough. The lower fitment body 180 increases in perimeter or diameter (depending on the shape) as the body transitions from the upper end to the lower end 184. This provides for a larger exit opening 187 for the fluid. The lower fitment body 180 may also include an internal flange 188 extending radially inward and positioned to engage the ring 176.

The headpiece 165 is secured to the lower end of the lower fitment 160. The securing means may include threads or a snap-lock fitment (obtained through locking beads complimentary on both the inside of the headpiece and on the outside of the lower fitment). In the illustrative embodiment, the securing means includes threads, such that the headpiece 165 can be removed and cleaned or changed with another headpiece.

The headpiece 165 is illustrated in greater detail in FIG. 7*a* through 7*d*. The headpiece 165 includes a bottom concave surface 168 that transitions into a side surface 169. The side surface 169 may include a plurality of knurls 180 positioned around the outside thereof. The knurls 180 provides the user with a surface that can be gripped when threaded the headpiece on or off of the lower fitment 160. Internally, the headpiece 165 is shown with threads 184 along the inside of the side surface 169 for providing a securing means to complimentary threads on the lower end of the lower fitment. The headpiece 165 is also provide with a plurality of openings 186 positioned through the bottom concave surface 168 to permit the fluid to eject or flow out of the nozzle assembly 135. The openings 186 may be slightly arcuate and are positioned into two concentric rows, 186A and 186B. The first concentric row 186A is, positioned within the second concentric row 186B, and positioned closer to the center 188 of the headpiece 165, while the second concentric row 186B is positioned closer to the transition portion between the bottom concave surface 168 and the side surface 169. In addition, the concentric row of openings positioned towards the center of the headpiece are smaller openings then the concentric row of openings positioned towards the transition portion between the bottom and side surfaces.

Figure 2:
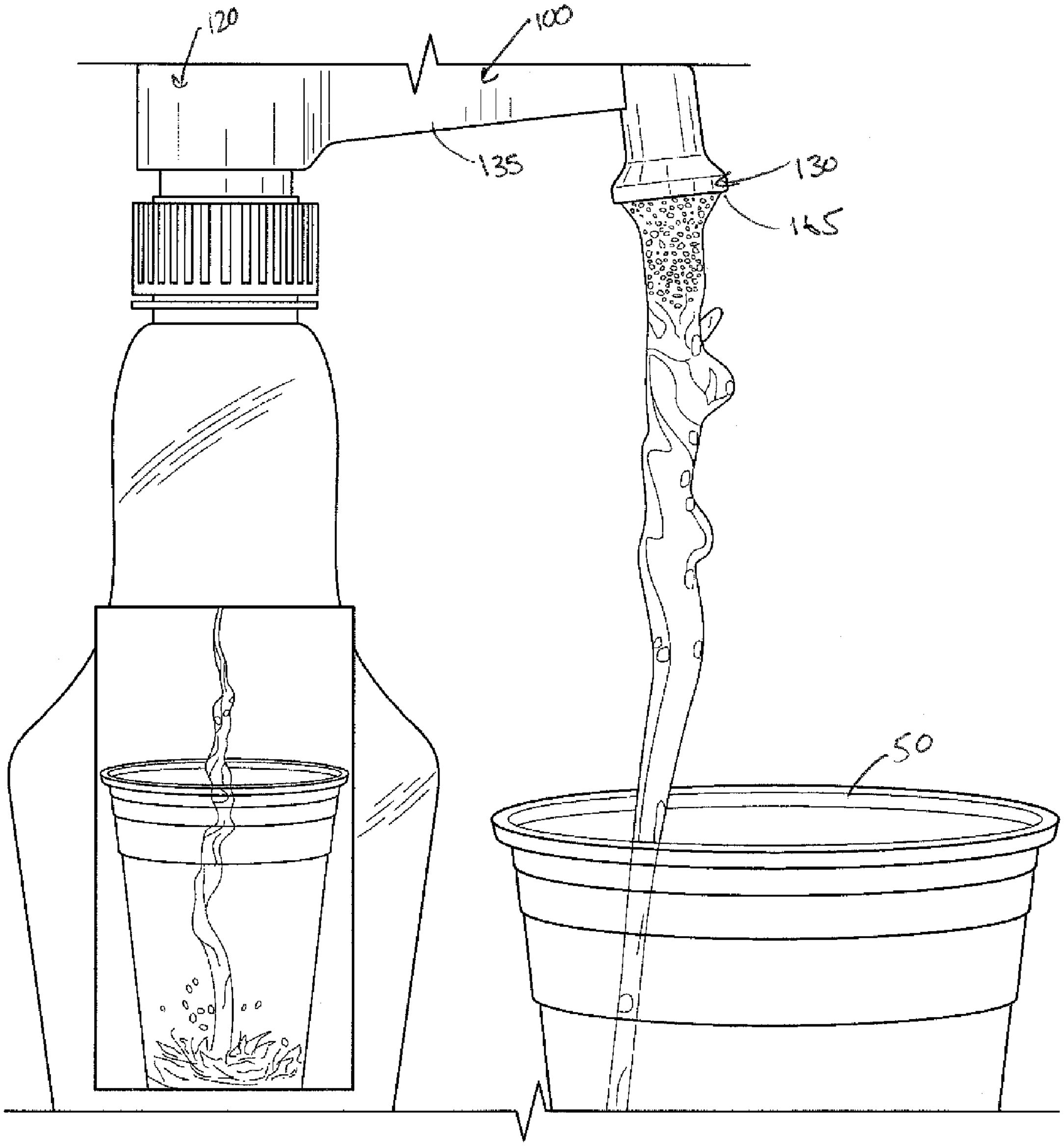
FIG. 2 is a perspective view of a dispenser in accordance with an embodiment of the present invention showing the ability to keep the liquid in a substantially single stream of liquid.
Figure 3:
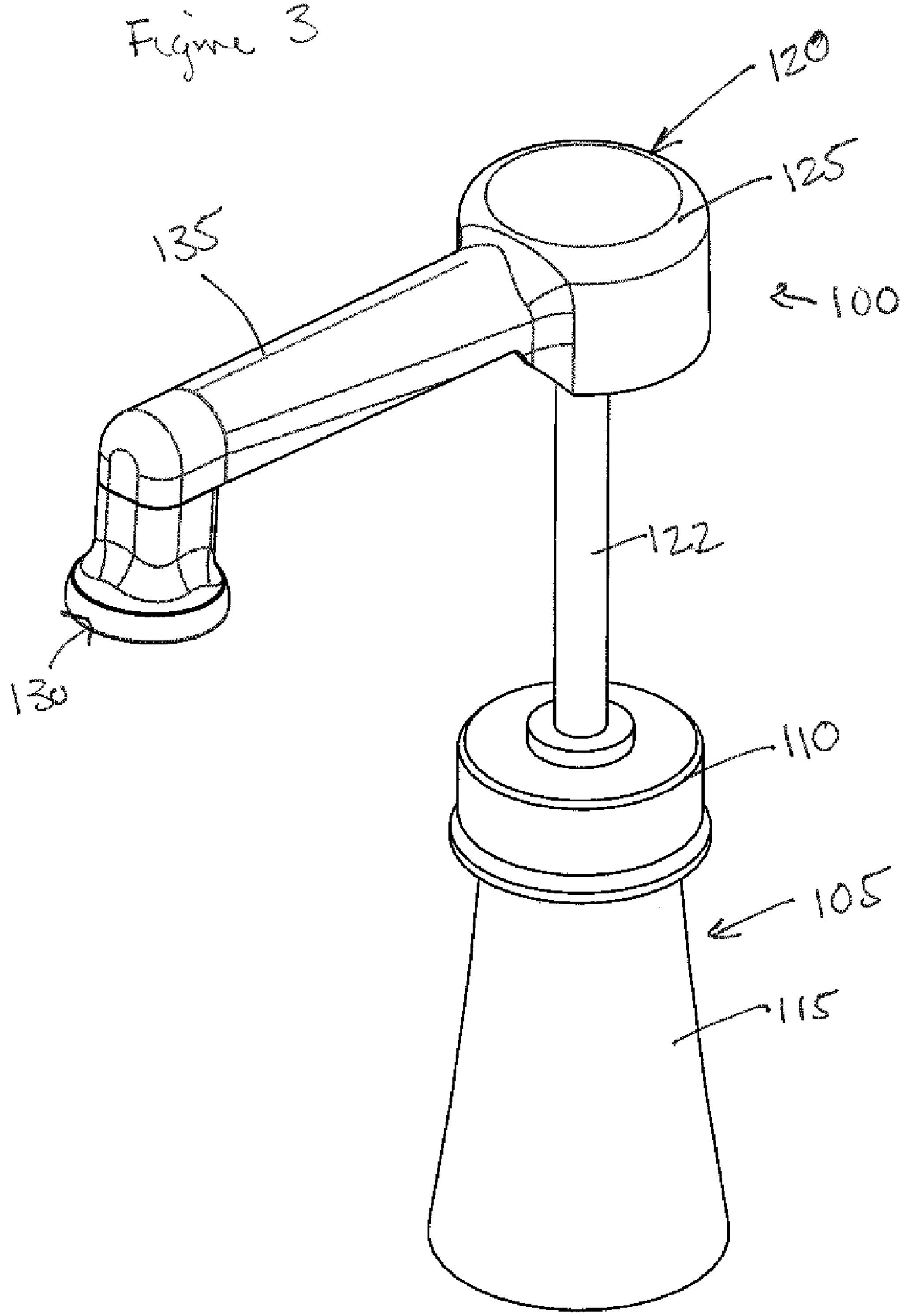
FIG. 3 is a perspective view of an improved actuator head for a dispenser in accordance with an embodiment of the present invention.
Figure 4:
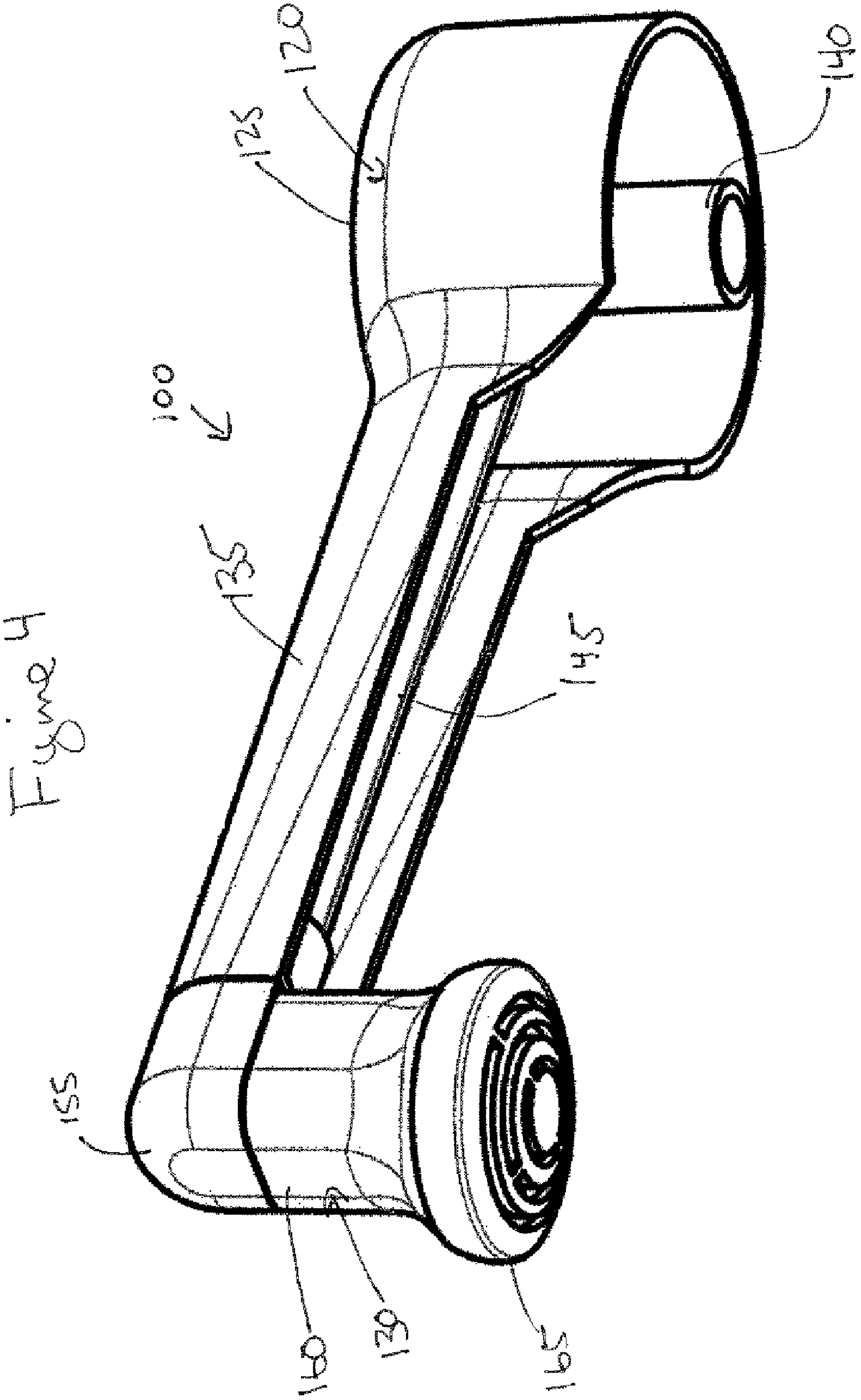
FIG. 4 is a lower perspective view of an improved actuator head for a dispenser in accordance with an embodiment of the present invention.

Rather than incorporate a single large opening which causes splatter, the plurality of openings 186 have been proven to reduce splatter and keep the fluid mostly contained in a single stream. As illustrated in FIG. 2, an embodiment of the present invention shows that an improved actuator head 100 can decrease the dispersion and maintain a fluid stream of liquid, reducing any mess that may be caused by simply holding or placing the cup away from the nozzle.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

I claim:

1. An actuator used for drawing fluid through a tube from a container, the actuator comprising:

a depressor face having an upper side adapted for engagement by an operator and a lower end having a connector adapted for engagement to an end of the tube;

a neck extending from a side end of the depressor face, the neck having a channel in fluid communication with the connector; and a nozzle assembly secured to an end of the neck and having an internal channel in fluid communication with the channel defined by the neck and having an exit end for the ejection of the fluid manually pumped from the container, the nozzle assembly further including a headpiece secured thereto, wherein the headpiece is defined as having a bottom surface transitioning to a surrounding side surface and a plurality of openings is positioned about the bottom surface; and wherein the plurality of openings are positioned into a pair of concentric rows, defined as a first concentric row of openings and a second concentric row of openings, and wherein the first concentric row of openings are positioned within the second concentric row of openings and wherein the first concentric row of openings have smaller openings than the second concentric row of openings.

2. The actuator of claim 1, wherein the headpiece includes threads adapted to complimentary threads on the exit end of the nozzle assembly such that the headpiece is removably secured to the exit end of the nozzle assembly.

3. The actuator of claim 1, wherein the bottom surface is concaved.

4. The actuator of claim 1, wherein the headpiece further includes a plurality of knurls positioned around an outside portion of the surrounding side surface.

5. An actuator used for drawing fluid through a tube from a container, the actuator comprising:

a depressor face having an upper side adapted for engagement by an operator and a lower end having a connector adapted for engagement to an end of the tube;

a neck extending from a side end of the depressor face, the neck having a channel in fluid communication with the connector; and a nozzle assembly secured to an end of the neck and having an internal channel in fluid communication with the channel defined by the neck and having an exit end for the ejection of the fluid manually pumped from the container, the nozzle assembly further including a headpiece secured thereto, wherein the headpiece is defined as having a bottom surface transitioning to a surrounding side surface and a plurality of openings is positioned about the bottom surface; and wherein the nozzle assembly includes a corner fitment having first and second ends, the first end being secured to an end of the neck; and the nozzle assembly further includes a lower fitment having upper and lower ends, the upper end being secured to the second end of the corner fitment, and the lower end having means for attaching the headpiece; and wherein the first end of the corner fitment having a protruding member being received into an opening defined by the end of the neck and wherein the second end of the corner fitment having a protruding element being received into an opening defined by the upper end of the lower fitment.

6. The actuator of claim 5, wherein the protruding element of the second end of the corner fitment includes a ring for complimentary engagement with an internal flange extending inwardly within the lower fitment.

7. The actuator of claim 6, wherein the lower fitment includes a body having a tapering profile that increases in perimeter from the upper end to the lower end.

8. An actuator for use with a pump and in connection with a fluid container, the actuator having a depression face and a neck extending there from and connection to a corner fitment having a corner end extending downwardly, the improvement of the actuator comprising:

a lower fitment having upper and lower ends, the upper end being secured to the corner end of the corner fitment, and a headpiece attached to the lower end of the lower fitment, the headpiece having a bottom surface transitioning to a surrounding side surface and a plurality of openings is positioned about the bottom surface; and wherein the plurality of openings are positioned into a pair of concentric rows, defined as a first concentric row of openings and a second concentric row of openings, and wherein the first concentric row of openings are positioned within the second concentric row of openings and wherein the first concentric row of openings have smaller openings than the second concentric row of openings.

9. The actuator of claim 8, wherein the bottom surface of the headpiece is concaved.

10. The actuator of claim 8 wherein the lower fitment includes a body having a tapering profile that increases in perimeter from the upper end to the lower end.

* * * * *